(12) United States Patent
Lee et al.

(10) Patent No.: US 11,718,532 B2
(45) Date of Patent: Aug. 8, 2023

(54) PREPARATION METHOD OF HIGH PURITY SIC POWDER

(71) Applicant: KCindustrial Co., Ltd., Seoul (KR)

(72) Inventors: Gyu Do Lee, Suwon-si (KR); Tae Hee Kim, Pyeongtaek-si (KR); Chae Young Lee, Cheonan-si (KR)

(73) Assignee: KCindustrial Co., Ltd., Seoul (KR)

( * ) Notice: Subject to any disclaimer, the term of this patent is extended or adjusted under 35 U.S.C. 154(b) by 667 days.

(21) Appl. No.: 16/692,036

(22) Filed: Nov. 22, 2019

(65) Prior Publication Data

US 2020/0207630 A1 Jul. 2, 2020

(30) Foreign Application Priority Data

Dec. 27, 2018 (KR) .......... 10-2018-0170220
Sep. 3, 2019 (KR) .......... 10-2019-0109045
Sep. 3, 2019 (KR) .......... 10-2019-0109046

(51) Int. Cl.
*C01B 32/956* (2017.01)
*B02C 23/10* (2006.01)
*B02C 21/00* (2006.01)

(52) U.S. Cl.
CPC .......... *C01B 32/956* (2017.08); *B02C 21/00* (2013.01); *B02C 23/10* (2013.01); *C01P 2004/61* (2013.01); *C01P 2004/62* (2013.01); *C01P 2004/64* (2013.01); *C01P 2006/80* (2013.01)

(58) Field of Classification Search
None
See application file for complete search history.

(56) References Cited

U.S. PATENT DOCUMENTS

| | | | |
|---|---|---|---|
| 8,844,729 B2 | 9/2014 | Stueven et al. | |
| 2002/0165078 A1 | 11/2002 | Otsuki et al. | |

FOREIGN PATENT DOCUMENTS

| | | |
|---|---|---|
| CN | 102285654 A | 12/2011 |
| CN | 103922343 A | 7/2014 |
| CN | 107162000 A | 9/2017 |
| JP | 533070 A | 2/1993 |
| JP | 11199323 A | 7/1999 |
| JP | 2000254543 A | 9/2000 |
| JP | 2002-326876 A | 11/2002 |
| JP | 2011-74436 A | 4/2011 |
| JP | 2016-98162 A | 5/2016 |
| JP | 6157534 B2 | 7/2017 |
| JP | 2018-16498 A | 2/2018 |
| KR | 10-1692000 B1 | 1/2017 |

OTHER PUBLICATIONS

Ishida et al.; JP2016098162A; translation provided by Google, Jun. 17, 2022.*
Google Translation Jiangsu CN10228564; Dec. 3, 2022.*

* cited by examiner

*Primary Examiner* — Guinever S Gregorio
(74) *Attorney, Agent, or Firm* — Sughrue Mion, PLLC

(57) ABSTRACT

The process for preparing high purity SiC powders according to the embodiment not only solves the environmental problems by using waste SiC, but also reduces the manufacturing cost with high yield, high productivity, and high uniformity.

9 Claims, No Drawings

PREPARATION METHOD OF HIGH PURITY SIC POWDER

TECHNICAL FIELD

The present invention relates to a process for preparing high purity silicon carbide (SiC) powders using SiC wastes.

BACKGROUND ART

Silicon carbide (SiC) has the advantages that it is excellent in heat resistance and mechanical strength, is resistant to radiation, and can be produced as a large diameter substrate. In addition, silicon carbide has excellent physical strength and chemical resistance, has a large energy band gap, and has a high saturated drift velocity of electrons and a high breakdown voltage. Therefore, it is widely used not only for semiconductor devices requiring high power, high efficiency, high breakdown voltage, and high capacity, but also for abrasives, bearings, fireproof plates, and the like.

For example, Japanese Laid-open Patent Publication No. 2002-326876 discloses a process for preparing silicon carbide by reacting a silicon carbide precursor subjected to a heat treatment step at high temperatures in an inert gas condition such as argon (Ar) or the like in order to polymerize or cross-link a silicon source and a carbon source. However, this process has the problems that the manufacturing cost is high because of the high-temperature heat treatment at 1,800° C. to 2,100° C. under vacuum or inert gas conditions and that the size of powders is not uniform.

Further, wafers used in the solar cell and semiconductor industries are manufactured by growing silicon ingots in a crucible made of graphite or the like. In this manufacturing process, a considerable amount of waste slurry that contains silicon carbide, as well as silicon carbide waste adsorbed on the inner wall of the crucible, is generated. Up to the present, however, such wastes have been landfilled, thereby causing environmental problems and incurring high disposal costs.

DISCLOSURE OF THE INVENTION

Technical Problem

Accordingly, the embodiment aims to provide a process for preparing high purity silicon carbide powders, which not only solves the environmental problems by using silicon carbide (SiC) wastes as a resource, but also reduces the manufacturing cost with high yield, high productivity, and high uniformity.

Solution to Problem

According to one embodiment, there is provided a process for preparing SiC powders, which comprises pulverizing waste SiC; classifying the pulverized waste SiC; removing an iron (Fe) component from the classified waste SiC; and cleaning the waste SiC from which the iron component has been removed.

According to another embodiment, there is provided a process for preparing SiC powders, which comprises cutting waste SiC; removing graphite from the cut waste SiC; pulverizing the waste SiC from which the graphite has been removed; removing an iron (Fe) component from the pulverized waste SiC; and cleaning the waste SiC from which the iron component has been removed.

Advantageous Effects of Invention

The process for preparing SiC powders according to the embodiment solves the environmental problems by recycling SiC wastes (hereinafter, waste SiC) and reduces the manufacturing cost. Further, this preparation process is capable of preparing high purity SiC powders with high yield, high productivity, and high uniformity.

BEST MODE FOR CARRYING OUT THE INVENTION

Hereinafter, the invention will be described in detail with reference to the embodiments. The embodiments are not limited to those described below and may be modified into various forms as long as the gist of the invention is not altered.

Throughout the present specification, when a part is referred to as "comprising" an element, it is understood that other elements may be comprised, rather than other elements are excluded, unless specifically stated otherwise.

All numbers and expression related to the quantities of components, reaction conditions, and the like used herein are to be understood as being modified by the term "about," unless otherwise indicated.

The process for preparing SiC powders according to one embodiment comprises pulverizing waste SiC; classifying the pulverized waste SiC; removing an iron (Fe) component from the classified waste SiC; and cleaning the waste SiC from which the iron component has been removed.

The process for preparing SiC powders according to another embodiment comprises cutting waste SiC; removing graphite from the cut waste SiC; pulverizing the waste SiC from which the graphite has been removed; removing an iron (Fe) component from the pulverized waste SiC; and cleaning the waste SiC from which the iron component has been removed.

The raw material used in the process for preparing SiC powders according to one embodiment may be waste SiC.

An SiC material used during the growth of an SiC single crystal ingot or an SiC coating material prepared by a CVD (chemical vapor deposition) process or the like, which cannot be used due to product defects, or an SiC material that can no longer be used due to the end of life in a semiconductor process, may be used as the waste SiC. Since SiC is an expensive material, the preparation of SiC powders using such waste SiC would reduce the manufacturing cost, and the recycling of waste SiC that has been landfilled would protect the environment.

According to one embodiment, the waste SiC may comprise at least one impurity selected from the group consisting of Li, Na, Mg, Al, K, Ca, Ti, V, Cr, Mn, Fe, Co, Ni, Cu, Zn, and Mo in an amount of 0.1 ppm to 15 ppm. For example, the amount of impurities may be 0.1 ppm to 13 ppm, 0.3 ppm to 12 ppm, 0.5 ppm to 12 ppm, 0.5 ppm to 10 ppm, 0.5 ppm to 8 ppm, 0.8 ppm to 10 ppm, 1 ppm to 10 ppm, 1 ppm to 8 ppm, 1 ppm to 6 ppm, 0.1 ppm to 5 ppm, 0.5 ppm to 4 ppm, 0.1 ppm to 3 ppm, 0.5 ppm to 3 ppm, or 0.5 ppm to 2 ppm.

In addition, the waste SiC may not comprise graphite or may comprise graphite in an amount of 50% by weight or less. For example, in the case where the waste SiC comprises graphite, the amount thereof may be 45% by weight or less or 40% by weight or less. Specifically, the amount thereof may be 1% by weight to 50% by weight, 1% by weight to 45% by weight, 1% by weight to 40% by weight, 5% by weight to 40% by weight, 5% by weight to 35% by weight, 5% by weight to 30% by weight, or 5% by weight to 20% by weight.

Step of Cutting Waste SiC

According to one embodiment, the waste SiC may be cut to be used. Specifically, the step of cutting the waste SiC may be further carried out prior to the step of pulverizing the waste SiC.

According to one embodiment, the waste SiC may be cut to 0.1 mm to 150 mm. For example, the waste SiC may be cut to 0.1 mm to 130 mm, 0.1 mm to 100 mm, 0.5 mm to 80 mm, 1 mm to 80 mm, 5 mm to 70 mm, 10 mm to 70 mm, or 20 mm to 50 mm.

The cutting may be carried out to the desired length using a bar cutting machine.

If the waste SiC is cut, the waste SiC can be efficiently pulverized in a subsequent process. In addition, if the waste SiC comprises graphite, cutting the waste SiC to a constant and appropriate size allows the graphite to be effectively removed in a subsequent process. Specifically, if the size of the cut SiC is too large or small, or is not uniform, graphite may not be effectively removed in a subsequent process.

Step of Removing Graphite from Waste SiC

If the waste SiC comprises graphite, the process for preparing SiC powders according to one embodiment may further comprise removing the graphite from the waste SiC prior to the step of pulverizing the waste SiC. Specifically, the process for preparing SiC powders according to one embodiment may further comprise cutting waste SiC that comprise graphite and removing the graphite from the cut waste SiC, prior to the step of pulverizing the waste SiC. The waste SiC that comprises graphite may be waste SiC in which the graphite is adsorbed on the surface thereof.

According to one embodiment, the step of removing graphite may be carried out by shot blasting. Specifically, a steel cut wire shot may be used in the step of removing graphite from the waste SiC. The steel cut wire shot may be made of carbon steel, stainless steel, aluminum, zinc, nickel, copper, or an alloy thereof, but it is not limited thereto.

According to one embodiment, the steel cut wire shot may have a diameter of 0.2 mm to 0.8 mm or 0.4 mm to 0.6 mm.

In addition, the step of removing graphite may be carried out under the conditions of 1,000 rpm to 5,000 rpm and 1 KPa to 1 MPa.

More specifically, the step of removing graphite may be carried out for 80 to 130 minutes at a rotational speed of 60 Hz (i.e., 3,600 rpm). For example, the step of removing graphite may be carried out for 90 to 120 minutes or 100 to 110 minutes at a rotational speed of 60 Hz. In addition, the shot blasting may be carried out 2 to 4 times under the above conditions, if necessary.

If the above conditions are satisfied, graphite can be removed more efficiently, thereby enhancing the purity of SiC finally prepared.

The step of removing graphite may further comprise, after carrying out the shot blasting, checking whether the graphite is removed using an LED lamp.

In addition, sand blasting may be further carried out prior to carrying out the blasting. The sand blasting may further enhance the removal rate of graphite.

The waste SiC from which graphite has been removed by the step of removing graphite may comprise graphite in an amount of 0.1% by weight or less based on the total weight of the waste SiC. For example, the waste SiC from which graphite has been removed by the step of removing graphite may comprise graphite in an amount of 0.09% by weight or less or 0.05% by weight based on the total weight of the waste SiC. More specifically, the waste SiC may comprise graphite in an amount of 0.001% by weight to 0.1% by weight, 0.005% by weight to 0.1% by weight, 0.01% by weight to 0.1% by weight, or 0.05% by weight to 0.1% by weight, based on the total weight of the waste SiC.

According to one embodiment, the step of removing graphite may further comprise, prior to and after the shot blasting step, an oxidation step and/or a quenching step. For example, the step of removing graphite may be carried out by the shot blasting step, the oxidation step, and the quenching step in sequence, or by the oxidation step, the quenching step, and the shot blasting step in sequence.

[Oxidation Step]

According to one embodiment, the step of removing graphite may further comprise oxidizing the cut waste SiC.

The oxidation step can efficiently remove graphite by oxidizing the graphite adsorbed on the waste SiC (see the reaction scheme below).

[Reaction Scheme]

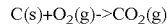

$$C(s)+O_2(g)\rightarrow CO_2(g)$$

According to one embodiment, the oxidation step may be carried out prior to the shot blasting. If the oxidation step is carried out prior to the shot blasting, graphite can be more easily separated and removed from the waste SiC.

According to one embodiment, the oxidation step may be carried out after the shot blasting. If the oxidation step is carried out after the shot blasting, the removal rate of graphite can be further enhanced by removing fine graphite remaining after the shot blasting step.

It is important to maintain the temperature to be constant in the oxidation step. For example, the oxidation step may be carried out at 1,200° C. or lower, 100° C. to 1,200° C., or 500° C. to 1,200° C. If the above temperature range is exceeded, oxygen and SiC react to form silicon oxide ($SiO_2$). Thus, the above temperature range must be maintained.

According to one embodiment, the oxidation step may comprise a first oxidation step and a second oxidation step.

The first oxidation step is an oxidation step carried out prior to the shot blasting. It may be carried out for 5 to 50 hours, 5 to 30 hours, or 9 to 30 hours at 1,200° C. or lower, 100° C. to 1,200° C., or 500° C. to 1,200° C.

In addition, the second oxidation step is an oxidation step carried out after the shot blasting. It may be carried out for 5 to 20 hours, 5 to 15 hours, or 6 to 15 hours at 1,200° C. or lower, 100° C. to 1,200° C., or 500° C. to 1,200° C.

According to one embodiment, the step of removing graphite may comprise the first oxidation step, the shot blasting step, and the second oxidation step. For example, the step of removing graphite may be carried out by the first oxidation step, the shot blasting step, and the second oxidation step in sequence.

[Quenching Step]

According to one embodiment, the step of removing graphite may further comprise a quenching step. Specifically, the waste SiC may be quenched by rapidly cooling it upon the completion of the oxidation step in the step of removing graphite.

In the quenching step, thermal stress may be imparted by cooling the high-temperature waste SiC oxidized at 1,200° C. or less, 100° C. to 1,200° C., or 500° C. to 1,200° C., thereby pulverizing it.

In such event, the cooling may be carried out with a refrigerant, a solvent, or the like. For example, the quenching step may be carried out in at least one solvent selected from the group consisting of tap water, distilled water, deionized water, methanol, and ethanol. In such event, the solvent may be used in admixture with at least one refrigerant selected from the group consisting of dry ice, an ice pack, and ice. The ice pack may be commercially available that comprises a super absorbent polymer (SAP). In addition, in order to maintain the temperature of the cooling water to be constant, a cooling apparatus such as a heat exchanger may be used.

The quenching step may be carried out at 0° C. to 60° C., or 0° C. to 50° C.

The quenching step may comprise a first quenching step and a second quenching step.

The first quenching step and the second quenching step may be carried out immediately after the first oxidation step and the second oxidation step, respectively.

According to one embodiment, the step of removing graphite may comprise the first oxidation step, the first quenching step, the shot blasting step, the second oxidation step, and the second quenching step. For example, the step of removing graphite may be carried out by the first oxidation step, the first quenching step, the shot blasting step, the second oxidation step, and the second quenching step in sequence.

Specifically, in the step of removing graphite, the cut waste SiC may be primarily oxidized (i.e., first oxidation step) to separate the graphite adsorbed on the waste SiC and may be pulverized by quenching it (i.e., first quenching step). The first quenching step may be carried out for 30 seconds to less than 10 minutes or 1 minute to less than 10 minutes at 15° C. to 50° C. or 20° C. to 50° C. The larger the temperature variation during the quenching, the finer the size of the pulverized waste SiC. But if the waste SiC is too fine, it is difficult to put it into the shot blaster, whereby the shot blasting step does not proceed well. Thus, the quenching must be carried out within the above temperature range. In addition, since SiC has a high heat transfer coefficient, the quenching time should not exceed 10 minutes.

Once the waste SiC, which has been subjected to the first quenching step, is dried to remove water, it is put into a shot blaster and then secondarily oxidized (i.e., second oxidation step). The graphite adsorbed on the waste SiC may be completely removed through the second oxidation step.

According to one embodiment, the step of removing graphite may further comprise, after the first quenching step, the second quenching step, or the shot blasting step, checking whether the graphite is removed using an LED lamp.

In addition, in the step of removing graphite, sand blasting may be further carried out prior to carrying out the shot blasting. The sand blasting may further enhance the removal rate of graphite.

The waste SiC, which has been subjected to the step of removing graphite that comprises the oxidation step and the quenching step, does not comprise graphite.

Step of Pulverizing Waste SiC

The process for preparing SiC powders according to one embodiment comprises pulverizing waste SiC.

According to one embodiment, in the step of pulverizing waste SiC, the waste SiC may be pulverized to 0.01 mm to 5 mm. For example, in the step of pulverizing waste SiC, the waste SiC may be pulverized to 0.05 mm to 4 mm, 0.05 mm to 3 mm, or 0.1 mm to 3 mm.

The step of pulverizing waste SiC may comprise a first pulverization step and a second pulverization step. In addition, the step of pulverizing waste SiC may be carried out using a jaw crusher or a ball mill.

Specifically, the first pulverization step may be carried out using a jaw crusher. Specifically, the waste SiC may be pulverized to 10 μm to 100 mm. For example, the waste SiC may be pulverized to 10 μm to 1,000 μm, 100 μm to 800 μm, 10 μm to 5,000 μm, 50 μm to 100 mm, 100 μm to 100 mm, 1,000 μm to 100 mm, 0.1 mm to 100 mm, 0.1 mm to 80 mm, 10 mm to 80 mm, or 30 mm to 50 mm. In addition, the jaw crusher may be operated at a rotational speed of 100 rpm to 800 rpm, 200 rpm to 600 rpm, or 300 rpm to 500 rpm.

The second pulverization step may be carried out using a ball mill. Specifically, the waste SiC may be pulverized to 10 nm to 100 mm. For example, the waste SiC may be pulverized to 100 nm to 1,000 nm, 300 nm to 1,000 nm, 500 nm to 5,000 nm, 0.1 mm to 100 mm, 0.1 mm to 80 mm, 10 mm to 80 mm, or 30 mm to 50 mm.

In addition, the second pulverization step may be carried out with steel balls. Specifically, the second pulverization step may be carried out for 20 minutes or longer, 20 minutes to 60 minutes, 20 minutes to 50 minutes, 20 minutes to 40 minutes, or 20 minutes to 30 minutes with steel balls having a size of 1 mm to 40 mm, 1 mm to 35 mm, 3 mm to 30 mm, or 5 mm to 30 mm.

Step of Screening Waste SiC

According to one embodiment, the process for preparing SiC powders may comprise, after the step of pulverizing waste SiC, screening the pulverized waste SiC (hereinafter, classifying step).

Specifically, the pulverized waste SiC may be screened using a screening apparatus according to the desired sizes thereof in the screening step. For example, the pulverized waste SiC may be screened to the sizes of less than 100 μm, 100 μm to less than 150 μm, 150 μm to less than 350 μm, 350 μm to less than 5,000 μm, but it is not limited thereto.

According to one embodiment, the screening step may be carried out using a twist screen, which is a vibrating screening apparatus.

The twist screen may use tapping balls made of silicon having a diameter of 10 mm to 80 mm, 15 mm to 70 mm, or 20 mm to 60 mm, and it may be operated for 10 minutes to 100 minutes under the condition of 1,000 rpm to 3,000 rpm. In addition, the pulverized waste SiC may be fed to the twist screen at a constant rate. In this case, the feed speed may be 1 mm/s to 1,000 mm/s, but it is not limited thereto.

Step of Classifying Waste SiC

The process for preparing SiC powders according to one embodiment may comprise classifying the pulverized waste SiC.

According to one embodiment, the step of classifying waste SiC may be carried out using a quantitative dispenser. Specifically, in the step of classifying waste SiC, the pulverized waste SiC may be classified to an iron removal machine through a quantitative dispenser. As the pulverized waste SiC is classified through a quantitative dispenser, the iron component can be more readily removed in a subsequent process.

According to one embodiment, the frequency of the quantitative dispenser may be 1 Hz to 100 Hz.

Specifically, the frequency of the quantitative regulator may be adjusted according to the particle size of the pulverized waste SiC.

According to one embodiment, if the particle size of the pulverized waste SiC is 10 nm to 100 μm, the frequency of the quantitative dispenser may be 1 Hz to 20 Hz. If the particle size of the pulverized waste SiC is greater than 100 μm to 50 mm, the frequency of the quantitative dispenser may be greater than 20 Hz to 60 Hz. If the particle size of the pulverized waste SiC is greater than 50 mm to 100 mm, the frequency of the quantitative dispenser may be greater than 60 Hz to 100 Hz.

According to one embodiment, the feed rate of the pulverized waste SiC in the step of classifying waste SiC may be 1 g/s to 2,000 g/s, 1 g/s to 1,500 g/s, 50 g/s to 2,000 g/s, 50 g/s to 1,500 g/s, 100 g/s to 2,000 g/s, 10 g/s to 100 g/s, or 1 g/s to 50 g/s.

Specifically, the feed rate of the pulverized waste SiC to the quantitative dispenser may be adjusted according to the particle size of the pulverized waste SiC.

According to one embodiment, if the particle size of the pulverized waste SiC is 10 nm to 100 μm, the feed rate of the pulverized waste SiC may be 1 g/s to 50 g/s, preferably 1 g/s to 10 g/s. If the particle size of the pulverized waste SiC is greater than 100 μm to 50 mm, the feed rate of the pulverized waste SiC may be greater than 50 g/s to 1,000 g/s, preferably greater than 50 g/s to 800 g/s. If the particle size of the pulverized waste SiC is greater than 50 mm to 100 mm, the feed rate of the pulverized waste SiC may be greater than 1,000 g/s to 2,000 g/s, preferably greater than 1,000 g/s to 1,500 g/s.

Step of Removing an Iron (Fe) Component

The process for preparing SiC powders according to one embodiment comprises removing an iron (Fe) component from the classified waste SiC.

The process for preparing SiC powders according to another embodiment comprises removing an iron (Fe) component from the classified waste SiC.

Specifically, the step of removing an iron component is a step of removing the iron component that can be adsorbed to the waste SiC in the step of pulverizing the waste SiC. More specifically, iron ions that can be adsorbed to the waste SiC in the second pulverization step may be removed.

The step of removing an iron component may be carried out using an iron removal apparatus such as a rotary metal detector. In such event, the rotary metal detector is provided with a quantitative dispenser as described above, to thereby effectively remove iron ions by adjusting the frequency of the quantitative dispenser according to the particle size of the pulverized waste SiC. In addition, the iron component can be effectively removed by controlling the feed rate with the magnetic force.

In such event, if the rotational speed of the rotary metal detector is 100 rpm to 800 rpm, the power of the electromagnet may be 0.5 kW to 3 kW. If the rotational speed of the rotary metal detector is greater than 800 rpm to 1,700 rpm, the power of the electromagnet may be greater than 3 kW to 5.3 kW.

The waste SiC, which has been subjected to the step of removing the iron component, may comprise iron in an amount of 1 ppm or less, more specifically 0.5 ppm or less, 0.3 ppm or less, or 0.1 ppm or less.

Step of Cleaning Waste SiC

The process for preparing SiC powders according to one embodiment comprises cleaning the waste SiC from which the iron component has been removed.

According to one embodiment, the step of cleaning waste SiC may comprise a first washing step, a leaching step, a first deposition step, a second washing step, and a second deposition step. For example, the step of cleaning waste SiC may be carried out by the first washing step, the leaching step, the first deposition step, the second washing step, and the second deposition step in sequence.

According to one embodiment, the step of cleaning waste SiC may be carried out with a cleaning solution containing hydrogen fluoride.

The first washing step may be carried out for 1 minute to 300 minutes with ultrapure or pure water. For example, the first washing step may be carried out for 1 minute to 250 minutes, 1 minute to 200 minutes, 3 minutes to 150 minutes, 10 minutes to 100 minutes, 15 minutes to 80 minutes, 20 minutes to 60 minutes, 20 minutes to 40 minutes.

The leaching step is a step of leaching the waste SiC using a cleaning solution containing hydrogen fluoride, and it may be carried out using an agitation method. For example, the leaching step may be carried out for 1 minute to 300 minutes, 1 minute to 250 minutes, 1 minute to 200 minutes, 3 minutes to 150 minutes, 10 minutes to 100 minutes, 15 minutes to 80 minutes, 20 minutes to 60 minutes, 20 minutes to 40 minutes.

The first deposition step is a step of depositing the waste SiC using a cleaning solution containing hydrogen fluoride. For example, the first deposition step may be carried out for 1 minute to 300 minutes, 1 minute to 250 minutes, 1 minute to 200 minutes, 3 minutes to 150 minutes, 10 minutes to 100 minutes, 15 minutes to 80 minutes, 20 minutes to 60 minutes, 20 minutes to 40 minutes.

The second washing step may be carried out with distilled water for 1 minute to 300 minutes, 1 minute to 250 minutes, 1 minute to 200 minutes, 3 minutes to 150 minutes, 10 minutes to 100 minutes, 15 minutes to 80 minutes, 20 minutes to 60 minutes, 20 minutes to 40 minutes.

The second deposition step is a step of depositing the waste SiC using a cleaning solution containing hydrogen fluoride. For example, the second deposition step may be carried out for 1 minute to 300 minutes, 1 minute to 250 minutes, 1 minute to 200 minutes, 3 minutes to 150 minutes, 10 minutes to 100 minutes, 15 minutes to 80 minutes, 20 minutes to 60 minutes, 20 minutes to 40 minutes.

The step of cleaning waste SiC may be carried out for 2 hours to 5 hours or for 3 hours. The step of cleaning waste SiC may be carried out 3 times or more or 3 to 5 times.

The step of cleaning the waste SiC is advantageous to maximizing the purity of the SiC powders.

The process for preparing SiC powders according to one embodiment may further comprise, after the step of cleaning the waste SiC, determining the content of the iron component.

According to one embodiment, the SiC powders, which have been subjected to the step of cleaning waste SiC, may have a purity of 95% to 99.9999%, 95%© to 99.99999%, 96%© to 99.9999%, 96% to 99.99999%, 97% to 99.9999%, 97% to 99.99999%, 98% to 99.9999%, 98% to 99.99999%, 99% to 99.9999%, or 99% to 99.99999%.

According to one embodiment, the SiC powders, which have been subjected to the step of cleaning waste SiC, may comprise at least one impurity selected from the group consisting of Li, Na Mg, Al, K, Ca, Ti, V, Cr, Mn, Fe, Co, Ni, Cu, Zn, and Mo in an amount of 1 ppm or less, 0.8 ppm or less, 0.7 ppm or less, 0.1 to 0.7 ppm, or 0.1 to 0.6 ppm.

According to one embodiment, the SiC powders, which have been subjected to the step of cleaning waste SiC, may have an average particle diameter of 10 μm to 100 mm. For example, the average particle diameter of the SiC powders, which have been subjected to the step of cleaning waste SiC, may be 10 μm to 5,000 μm, 50 μm to 1,000 μm, 100 μm to 2,000 μm, or 1,000 μm to 10,000 μm.

According to one embodiment, the SiC powders, which have been subjected to the step of cleaning waste SiC, may have a standard deviation of the average particle diameter of 1 μm to 30 μm. For example, the standard deviation of the average particle diameter of the SiC powders, which have been subjected to the step of cleaning waste SiC, may be 1 μm to 25 μm, 3 μm to 20 μm, or 5 μm to 20 μm.

The invention claimed is:

1. A process for preparing high purity SiC powders, which comprises:
   pulverizing waste SiC comprising an impurity, said impurity comprising Fe, and optionally one or more selected from the group consisting of Li, Na, Mg, Al, K, Ca, Ti, V, Cr, Mn, Co, Ni, Cu, Zn, and Mo;
   classifying the pulverized waste SiC based on a particle size of the pulverized waste SiC;
   feeding the classified pulverized waste SiC to a Fe-removal machine;
   removing the Fe from the classified pulverized waste SiC in the Fe-removal machine; and
   cleaning the waste SiC from which the Fe has been removed,
   wherein rate of the feeding the classified pulverized waste SiC to the Fe-removal machine is:
   (a) 1 g/s to 50 g/s for the classified pulverized waste SiC with the particle size from 10 nm to 100 μm,
   (b) greater than 50 g/s to 1,000 g/s for the classified pulverized waste SiC with the particle size greater than 100 μm to 50 mm, or
   (c) 1,000 g/s to 2,000 g/s for the classified pulverized waste SiC with the particle size greater than 50 mm to 100 mm.

2. The process for preparing high purity SiC powders of claim 1, wherein the step of pulverizing waste SiC comprises a first pulverization step, which is carried out using a jaw crusher, and a second pulverization step, which is carried out using a ball mill.

3. The process for preparing high purity SiC powders of claim 1, wherein the steps of classifying the pulverized waste SiC and feeding the classified pulverized waste SiC are carried out using a dispenser.

4. The process for preparing high purity SiC powders of claim 1, wherein the step of removing the Fe is carried out using magnetic force.

5. The process for preparing high purity SiC powders of claim 1, wherein the waste SiC, which has been subjected to the step of removing Fe, comprises Fe in an amount of 1 ppm or less.

6. The process for preparing high purity SiC powders of claim 1, wherein the step of cleaning waste SiC comprises a first washing step, a leaching step, a first deposition step, a second washing step, and a second deposition step.

7. The process for preparing high purity SiC powders of claim 1, wherein the purity of the SiC powders is 95% to 99.99999%.

8. The process for preparing high purity SiC powders of claim 1, wherein the SiC powders comprise the impurity in an amount of 1 ppm or less.

9. The process for preparing high purity SiC powders of claim 3, wherein, in the feeding of the classified pulverized waste SiC to the Fe-removal machine using a dispenser, frequency of vibration of the dispenser is:
   (a) 1 Hz to 20 Hz for the classified pulverized waste SiC with the particle size from 10 nm to 100 μm,
   (b) 20 Hz to 60 Hz for the classified pulverized waste SiC with the particle size greater than 100 μm to 50 mm, or
   (c) 60 Hz to 100 Hz for the classified pulverized waste SiC with the particle size greater than 50 mm to 100 mm.

* * * * *